US012017903B2

(12) United States Patent
Bouvier et al.

(10) Patent No.: US 12,017,903 B2
(45) Date of Patent: Jun. 25, 2024

(54) SYSTEM FOR THE TRANSFER AND GRAVITATIONAL DRAINAGE OF A GAS IN LIQUID FORM

(71) Applicant: GAZTRANSPORT ET TECHNIGAZ, Saint Remy les Chevreuse (FR)

(72) Inventors: Arnaud Bouvier, Saint Remy les Chevreuse (FR); Lucas Hurel, Saint Remy les Chevreuse (FR); Remy Prioleau, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 29 days.

(21) Appl. No.: 17/997,396

(22) PCT Filed: Apr. 22, 2021

(86) PCT No.: PCT/FR2021/050700

§ 371 (c)(1),
(2) Date: Oct. 28, 2022

(87) PCT Pub. No.: WO2021/219950

PCT Pub. Date: Nov. 4, 2021

(65) Prior Publication Data

US 2023/0192470 A1 Jun. 22, 2023

(30) Foreign Application Priority Data

Apr. 30, 2020 (FR) ...................................... 2004291

(51) Int. Cl.
*B67D 7/04* (2010.01)
*B67D 7/36* (2010.01)

(52) U.S. Cl.
CPC ............. *B67D 7/0401* (2013.01); *B67D 7/36* (2013.01); *B67D 2007/0451* (2013.01)

(58) Field of Classification Search
CPC ................................. B67D 9/00; B67D 7/401
See application file for complete search history.

(56) References Cited

U.S. PATENT DOCUMENTS

2011/0232767 A1 9/2011 Liem et al.
2013/0240085 A1* 9/2013 Hallot ...................... B67D 9/00 141/311 R (Continued)

FOREIGN PATENT DOCUMENTS

FR 3 018 766 A1 9/2015
WO WO 2010/059052 A1 5/2010

(Continued)

OTHER PUBLICATIONS

International Search Report mailed on Sep. 3, 2021 in PCT/FR2021/050700 filed on Apr. 22, 2021 (citing references 1-4 & 15-18 therein, 2 pages), translation not provided.

*Primary Examiner* — Jason K Niesz
(74) *Attorney, Agent, or Firm* — Oblon, McClelland, Maier & Neustadt, L.L.P.

(57) ABSTRACT

A transfer system, for transferring liquid-form gas between two liquid-form gas units, includes: a main pipe configured to transfer the liquid-form gas from a source tank of a liquid-form gas source unit to a receiving tank of a liquid-form gas receiving unit, the main pipe including at least a first portion and a flexible second portion; and at least one return pipe configured to convey the liquid-form gas present in the main pipe toward the source tank, the transfer system being configured to drain the liquid-form gas under gravity.

20 Claims, 5 Drawing Sheets

(56) References Cited

U.S. PATENT DOCUMENTS

Figure 1:
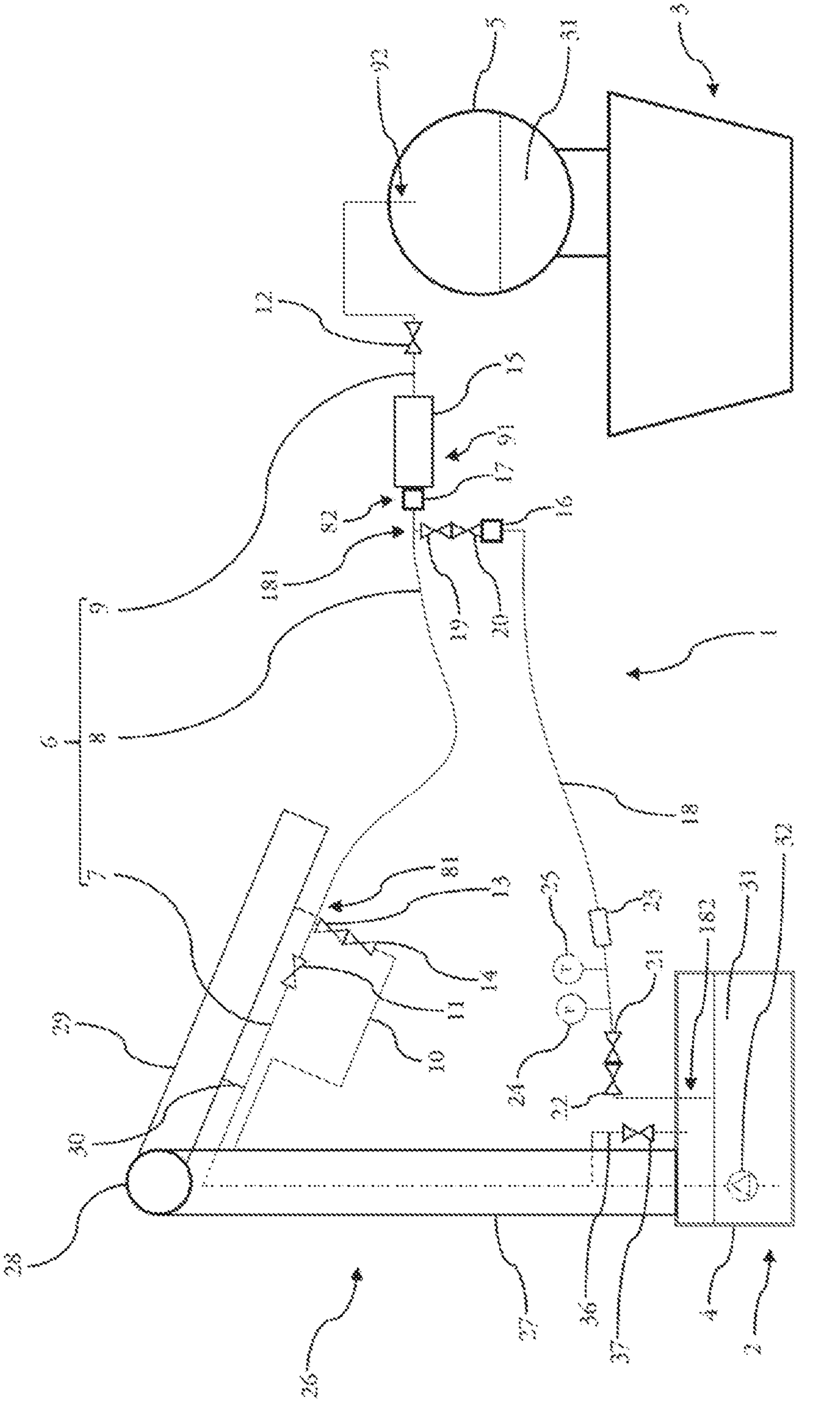

| | | | |
|---|---|---|---|
| 2014/0027008 | A1 | 1/2014 | Liem et al. |
| 2014/0090750 | A1 | 4/2014 | Liem et al. |
| 2017/0096195 | A1 | 4/2017 | Gelin et al. |
| 2021/0163278 | A1* | 6/2021 | Huijsmans-Steenkamp ................ B63B 27/25 |
| 2022/0180733 | A1* | 6/2022 | McNicholas ....... H01M 8/0606 |

FOREIGN PATENT DOCUMENTS

| | | | |
|---|---|---|---|
| WO | WO 2014/122159 | A1 | 8/2014 |
| WO | WO 2020/016406 | A1 | 1/2020 |

* cited by examiner

SYSTEM FOR THE TRANSFER AND GRAVITATIONAL DRAINAGE OF A GAS IN LIQUID FORM

The present invention relates to the field of the transportation and/or storage of gas in liquid form and more particularly the systems for transferring the liquid-form gas from one liquid-form gas transport and/or storage entity to another.

Liquid-form gas is regularly transported from one site to another by sea. Such transportation begins with a step of loading a maritime vessel with liquid-form gas. A ship suitable for this type of transport, for example a methane tanker, a barge, can thus collect a cargo of liquid-form gas from a liquid-form gas storage platform such as a floating reliquefaction unit, an on-shore reservoir or a gravity platform or GBS (gravity based structure).

It is known practice to load the liquid-form gas according to a specific loading method that consists in connecting a pipe that provides a fluidic connection between a liquid-form gas storage unit and a liquid-form gas transport ship or a ship that is propelled with the liquid-form gas. Thus, by means of a pumping device, liquid-form gas transport tanks present in the transport ship, or fuel tanks in the case of a ship that runs on the liquid-form gas, are filled with liquid-form gas until the transport ship or the ship running on liquid-form gas is fully loaded.

Once this liquid-form gas has been transferred, the pipe has to be disconnected from the receiving ship. Such disconnection is accompanied by risks, predominantly due to the fact that the liquid-form gas is at cryogenic temperature, for example of the order of −160° C. and potentially at a pressure higher than atmospheric pressure. As a result, if liquid-form gas is still present in the pipe when the transfer has been completed, this gas will flow, or even be sprayed, from the end of the pipe that is left free upon disconnection of the pipe. Because of its cryogenic temperature, the liquid-form gas may cause human injury and/or material damage if it flows out from the storage unit or from the transport ship. Such an outflow may also pollute the environment if it falls directly into the sea.

There is a solution for alleviating this risk: it is possible to boil off the liquid-form gas by spraying the pipe at length with seawater, this being done before said transfer pipe is disconnected. The seawater raises the temperature of the liquid-form gas that has remained in the pipe so that this gas boils off. Such a solution is nevertheless painstaking and time consuming, as the pipe needs to be sprayed for several hours during this operation, lengthening the amount of time for which the ship is out of action.

The present invention makes it possible to simplify and shorten this operation by proposing a transfer system for transferring liquid-form gas between two liquid-form gas units, comprising a main pipe configured to transfer the liquid-form gas from a source tank of a liquid-form gas source unit to a receiving tank of a liquid-form gas receiving unit, said main pipe comprising at least a first portion and a flexible second portion, the transfer system comprising an articulated support device for supporting the main pipe, the first portion being secured to the articulated support device and configured to withdraw the liquid-form gas contained in the source tank, characterized in that the transfer system comprises at least one return pipe configured to convey the liquid-form gas present in the main pipe toward the source tank, the transfer system for transferring liquid-form gas being configured to drain the liquid-form gas present in the main pipe under gravity toward the source tank via the return pipe.

Gravitational drainage ensures that the liquid-form gas returns to the source tank in a simplified way, in so far as only the return pipe needs to be connected to the main pipe. The transfer system according to the invention moreover makes it possible to accelerate the drainage procedure as the liquid-form gas is removed from the main pipe more quickly than by forcing the liquid-form gas to boil off. In addition, the drained liquid-form gas returns to the source tank thus making it possible to limit overall energy losses in comparison with an operation of boiling off the liquid-form gas, where the gas that is boiled off needs to be reliquefied or burnt by the liquid-form gas unit.

What is meant by a liquid-form gas unit is a floating structure, for example a barge, a methane tanker, a platform of the offshore platform type, or else an on-shore structure, for example an on-shore reservoir, the dockside in a harbor zone, a gravity platform. The liquid-form gas may thus be transferred from one floating structure to another floating structure, from an on-shore structure to a floating structure, or else from a floating structure to an on-shore structure. In general, the liquid-form gas is transferred from the liquid-form gas source unit to the liquid-form gas receiving unit. A nonexhaustive list of source units and their corresponding receiving unit(s) is given in the table below:

TABLE 1

| Source unit | Receiving unit |
|---|---|
| On-shore reservoir, floating reliquefaction unit, other reliquefaction unit, gravity platform | Methane tanker, barge, ship running on liquid-form gas of the cruise liner, container ship, ferry type |
| Methane tanker | Barge, ship running on liquid-form gas of the cruise liner, container ship, ferry type |
| Barge | Ship running on liquid-form gas of the cruise liner, container ship, ferry type |

The first portion of the main pipe opens onto the source tank so that the liquid-form gas contained therein can circulate in the first portion for the purposes of the transfer operation. The first portion may be rigid or flexible and extends mainly along the articulated support device that supports the main pipe. By way of example, the articulated support device may be a crane comprising a mast and a jib. The articulated support device bears the first portion of the main pipe and can be remotely controlled to make it extend and thus facilitate the connection of the main pipe to the liquid-form gas receiving unit.

The flexible second portion is positioned in the continuity with the first portion and is connected thereto. The flexibility of the flexible second portion ensures the latter freedom of movement and thus allows relative motion between the liquid-form gas source unit and the liquid-form gas receiving unit, particularly that caused by the swell. Once the connection has been made between the main pipe and the liquid-form gas receiving unit, the liquid-form gas transfer can be performed.

Once the transfer of the liquid-form gas is complete, the return pipe is connected to the main pipe. It is also possible for the return pipe to be connected to the main pipe right from the time that the latter is connected to the liquid-form gas receiving unit. In this latter instance, the return pipe is closed off so that the liquid-form gas does not flow therein during the liquid-form gas transfer operation. As a preference, the return pipe is flexible so as to facilitate its connection to the main pipe and to the source tank. Moreover, the flexibility of the return pipe allows relative motion between the liquid-form gas source unit and the liquid-form gas receiving unit, particularly that caused by the swell.

The return pipe extends from the main pipe to the source tank of the liquid-form gas source unit. The liquid-form gas that remains in the main pipe after the liquid-form gas transfer operation is therefore able to return to the source tank via the return pipe. Having ensured that no more liquid-form gas remains in the main pipe and the return pipe, the latter can be disconnected from the main pipe. The main pipe is then disconnected from the liquid-form gas receiving unit, something that can be done in complete safety and with no risk to the environment.

The transfer system also comprises a return gas pipe, not mentioned, between the liquid-form gas source unit and the liquid-form gas receiving unit when the storage facilities are at substantially equivalent pressures. This gas pipe allows gas to return from the liquid-form gas receiving unit to the liquid-form gas source unit so as to equalize the pressures between the respective tanks of the liquid-form gas receiving unit and the liquid-form gas source unit during the transfer of the liquid-form gas.

According to one feature of the invention, the return pipe comprises a first end connected to the main pipe and a second end configured to open into the source tank of the liquid-form gas source unit, the second end of the return pipe being vertically lower down than the first end of the return pipe. In order to perform gravitational drainage, the liquid-form gas needs to flow naturally in the return pipe, from the main pipe to the source tank. To achieve that, the first end of the return pipe, which is connected to the main pipe, is positioned at a higher height than that of the second end of the return pipe, which is connected to the source tank. Such a height differential can be determined with respect to a horizontal or substantially horizontal reference, for example sea level. Thus, when the liquid-form gas is circulating in the return pipe, this gas will flow toward the second end of the return pipe with no effort additional to that of gravity. The greater the difference in height between the two ends of the return pipe, the more rapidly and effectively the liquid-form gas will flow. Thus, advantageously, the difference in height between the two ends of the return pipe is at least three to four meters so as to optimize the operation of draining the liquid-form gas.

According to one feature of the invention, the flexible second portion of the main pipe comprises a first end and a second end, the first end of the flexible second portion being secured to the articulated support device. As indicated previously, the flexible second portion is continuous with the first portion via a direct connection between the latter and the first end of the flexible second portion, it being possible for a join between the first portion and the flexible second portion of the main pipe to consist of a safety member for example. As the articulated support device supports the first portion, it also indirectly supports the flexible second portion. Once the liquid-form gas transfer has been performed, and before the liquid-form gas remaining in the main pipe has been drained, the articulated support device is able to move in such a way as to raise the first end of the flexible second portion so that said first end is vertically higher up than the second end of the flexible second portion. The objective of such a maneuver is to create a downward slope between the first end of the flexible second portion and the second end of the flexible second portion so as to collect all of the liquid-form gas that has remained in the main pipe in a zone of the main pipe, said zone preferably being situated near the first end of the return pipe so as to optimize the drainage of the liquid-form gas.

According to one feature of the invention, the first end of the return pipe is connected to the main pipe via a first connection/disconnection device. Such a connection/disconnection device allows rapid connection and disconnection of the return line and ensures optimal sealing when connected. The main pipe is designed to allow the return pipe to be connected using the first connection/disconnection device.

According to one feature of the invention, the drainage of the liquid-form gas is activated by at least one flow controller situated on the return pipe. In other words, the flow controller allows and prevents circulation of the liquid-form gas within the return pipe. The flow controller is thus logically closed during the operation of transferring the liquid-form gas so that the latter can circulate from the source tank to the receiving tank via the main pipe. Once the operation of transferring the liquid-form gas is complete, the flow controller is then opened so as to allow the liquid-form gas to circulate in the return pipe. The flow controller is kept open throughout the operation of draining the liquid-form gas. The flow controller is then closed again once the operation of draining the liquid-form gas is complete.

According to one feature of the invention, the return pipe may be connected at the same time as the main pipe or during the transfer of liquid-form gas or at the end of the transfer of liquid-form gas.

According to one feature of the invention, the first end of the return pipe comprises a first flow controller and a second flow controller, the second end of the return pipe comprising a third flow controller and a fourth flow controller. The plurality of flow controllers at the ends of the return pipe notably makes it possible to regulate the flow rate of liquid-form gas flowing in the return pipe. Advantageously, when initializing the drainage operation, at least one of the flow controllers situated at the first end of the return pipe is opened progressively so as not to cause too great a quantity of liquid-form gas to circulate all at once. The progressive opening of at least one of the flow controllers of the return pipe thus makes it possible to avoid damaging the return pipe as a result of too great a flow rate of liquid-form gas circulating in the return pipe or too sudden a difference in pressure that could cause biphasic flow in the pipe.

According to one feature of the invention, the return pipe comprises an emergency disconnection device. In the event of excessively intense mechanical stresses being applied to the return pipe for some reason, for example as a result of a variation in the distance between the two liquid-form gas units caused by the sea swell, there is a risk that the return pipe may become damaged. In order to alleviate this disadvantage, the emergency disconnection device is able to separate the return pipe from the main pipe before the mechanical stresses applied to the return pipe damage it irreversibly. When the main pipe and the return pipe are disconnected in an emergency disconnect, their ends are fitted with an automatic shutoff device which prevents the outflowing of the liquid-form gas. The emergency disconnection device and the first connection/disconnection device may be one single device. In that case, it is at the connection to the main pipe that the return pipe disconnects. The emergency disconnection device may also be independent of the first connection/disconnection device and be positioned between the first end of the return pipe and the second end of the return pipe. Thus, in the event of excessively high mechanical stresses, the return pipe separates into two parts.

According to one feature of the invention, the return pipe comprises at least a pressure sensor and at least a temperature sensor sensing the pressure and the temperature of the return pipe. The pressure sensor and the temperature sensor may be positioned between the first end and the second end of the return pipe and respectively measure the pressure and the temperature in the return pipe. The pressure measurement makes it possible to determine at what moment it is possible to perform an operation of pressurizing the main pipe and the return pipe in order to drive the liquid-form gas remaining in the main pipe and that has not been able to be drained under gravity. Pressurization can be performed using an inert gas such as molecular nitrogen. Pressurization may also be performed using a vapor phase of the liquid-form gas, which vapor phase is taken from the source tank itself. This pressurizing operation is not, however, possible if the pressure in the return pipe is too high. Too high a pressure is liable to cause the liquid-form gas to flow into a pressurizing line. The pressure sensor therefore makes it possible to check that the pressure is sufficiently low in the return pipe for the pressurizing operation to be initiated completely safely.

The temperature sensor for its part measures the temperature in the return pipe. The temperature measurement makes it possible to check whether there is any liquid-form gas remaining within the return pipe. The presence of liquid-form gas in the return pipe is illustrated by a very low temperature registered by the temperature sensor. A minimum temperature threshold may be defined, it being considered that as soon as the measured temperature is above said temperature threshold, there is no longer any liquid-form gas in the return pipe.

According to one feature of the invention, the return pipe has a bore section of between 300 $mm^2$ and 2000 $mm^2$. In other words, if the return pipe is circular, the diameter of the return pipe is between 20 mm and 50 mm approximately. It has been verified that a return pipe with such a bore section is able to avoid potential boiling of the liquid-form gas when the latter circulates in the return pipe.

According to one feature of the invention, the circulation of the liquid-form gas within the main pipe is activated by at least a first valve positioned on the main pipe. In other words, the first valve allows or does not allow the liquid-form gas to circulate in the main pipe. Thus, during the transfer operation, the first valve is opened so that the liquid-form gas can circulate from the source tank to the receiving tank via the main pipe. Once the transfer operation is complete, the first valve can be closed again so as to isolate the liquid-form gas that has remained in the main pipe and that is intended to circulate through the return pipe.

According to one feature of the invention, the transfer system comprises a member for circulating the liquid-form gas which transfers the liquid-form gas from the source tank to the receiving tank via the main pipe. The member for circulating the liquid-form gas allows the liquid-form gas to be circulated through the main pipe during the transfer operation. Advantageously, the circulation member takes the form of a liquid-form gas pump. The member for circulating the liquid-form gas is set into operation once the main pipe has been connected to the liquid-form gas receiving unit.

According to one feature of the invention, the transfer system comprises a pressurizing line connected to the main pipe and configured to remove the liquid-form gas present in the main pipe and in the return pipe. The pressurizing line allows a fluid, for example an inert gas such as nitrogen, to be introduced. This gas, once it has entered the main pipe, drives the liquid-form gas therein, and then in the return pipe. The nitrogen may also be introduced at ambient temperature with a view to evaporating the liquid-form gas. The pressurizing line thus allows the traces of liquid-form gas that have not been drained off under gravity to be removed thus ensuring complete removal of the liquid-form gas. The fluid thus drives the liquid-form gas as far as the source tank. If the fluid is at ambient temperature, it evaporates off the remaining liquid-form gas.

According to one feature of the invention, the main pipe comprises a third portion, said third portion comprising a first termination provided with a header, and a second termination configured to open into the receiving tank. The third portion of the main pipe is situated at the level of the liquid-form gas receiving unit, so that the second termination can open into the receiving tank. At the first termination, the header has the function of contributing to the loading and/or unloading of the liquid-form gas by providing the connection between two portions of pipe used for transferring the liquid-form gas. The third portion therefore allows the liquid-form gas to circulate from the header to the receiving tank.

According to one feature of the invention, the third portion comprises at least a second valve positioned between the header of the third portion and the second termination of the third portion. In other words, the second valve contributes to allowing or preventing the circulation of liquid-form gas in the main pipe. The second valve is therefore open during the transfer operation, just like the first valve mentioned previously. Once the transfer is complete, the second valve is closed so as to isolate the receiving tank from the return pipe. Closure of the second valve makes it possible to avoid any return of liquid-form gas contained in the receiving tank to the return pipe during the drainage operation.

According to one feature of the invention, the flexible second portion is configured to be connected to the header of the third portion by a second connection/disconnection device. The connection between the flexible second portion and the third portion thus makes the connection between the source tank and the receiving tank. The liquid-form gas contained in the source tank is therefore able to circulate to the receiving tank via the main pipe during the transfer operation. For that, the second connection/disconnection device is designed to be connected to the header of the third portion. The second connection/disconnection device may be similar to the first connection/disconnection device fitted to the return pipe and mentioned previously.

According to one feature of the invention, the return pipe may be connected to the main pipe in the flexible second portion thereof upstream of the header. The terms upstream and downstream relating to the main pipe are defined with reference to the direction in which the liquid-form gas circulates in the main pipe, which is to say from the source tank toward the receiving tank. Such connection of the return pipe constitutes a first embodiment of the transfer system according to the invention.

According to one feature of the invention, the return pipe may be connected to the main pipe in the third portion thereof downstream of the header of the third portion and upstream of the second valve of the third portion. This then is a second embodiment of the transfer system according to the invention. The connecting of the return pipe to the third portion of the main pipe must, however, be performed upstream of the second valve so that closure of the latter can isolate the receiving tank from the return pipe. The embodiments according to the invention are thus defined by the position of the connection between the return pipe and the main pipe.

The invention also covers a drainage method for draining a liquid-form gas, implemented by a transfer system for transferring liquid-form gas as described hereinabove, and comprising:

- a first step in which at least the second valve of the third portion of the main pipe is closed,
- a second step in which the articulated support device supporting the main pipe is raised so as to position the first end of the flexible second portion vertically higher up than the second end of the flexible second portion,
- a third step in which at least the flow controller of the return pipe is opened.

The drainage method is initiated as soon as the transfer of the liquid-form gas from the source tank to the receiving tank via the main pipe is complete. As indicated previously, the drainage operation consists in eliminating the liquid-form gas that has remained in the main pipe after the transfer operation. The second valve of the third portion is closed so as to isolate the receiving tank from the return pipe. Of course, the connection of the return pipe to the main pipe is positioned upstream of the second valve.

The second step of the drainage method consists in raising the articulated support device. Because the first end of the second portion is secured to the articulated support device, it too is also raised. The purpose of this step is to create a difference in height between the first end of the flexible second portion and the second end of the flexible second portion which is connected to the header of the third portion. Thus, the liquid-form gas that has remained in the flexible second portion is directed toward the second end of the flexible second portion under the effect of gravity. The flexible second portion thus exhibits a continuous slope. This maneuver makes it possible to avoid the creation of pockets of liquid-form gas in the flexible second portion of the main pipe. Such pockets of liquid-form gas are liable to be situated some distance from the return pipe and carry the risk of not being drained out during the drainage method. Raising the articulated support device makes it possible to alleviate this problem by creating a height difference between the first end of the flexible second portion and the second end of the flexible second portion so that the liquid-form gas contained in the flexible second portion collects notably near the return pipe.

Once this second step has been performed, the flow controller of the return pipe can then be opened so that the liquid-form gas can flow into the return pipe.

According to one feature of the invention, the drainage method comprises an additional step that comes later than the first step, and during which at least the first valve of the main pipe is closed. This additional step can be performed at any time in the method so long as the first step has already been performed. Such an additional step constitutes a first variant of the drainage method, during which the first valve is closed for the purpose of isolating the liquid-form gas that has remained in the main pipe. As the second valve is also closed, the liquid-form gas that has remained in the main pipe is kept within a section of the main pipe that extends between the first valve and the second valve.

According to one feature of the invention, during the drainage method, a fluid different than the liquid-form gas is injected so as to drive out the liquid-form gas present in the main pipe. This injection of fluid comes after the additional step during which the first valve is closed and corresponds to a second variant of the drainage method. Said fluid corresponds to the fluid coming from the pressurizing line mentioned previously. This fluid thus allows the removal of the traces of liquid-form gas that have not flowed out under gravitational drainage. This fluid may be an inert gas such as molecular nitrogen. The fluid cannot be introduced if the pressure in the return pipe is too high. The pressure sensor for the return pipe as described hereinabove thus makes it possible to determine whether the pressure is low enough for this additional step to be performed. Once this has been done, and once the return pipe has opened during the third step of the drainage method, no more liquid-form gas remains in the main pipe and in the return pipe. These can then be disconnected in complete safety.

According to one feature of the invention, the drainage method comprises an additional step that comes later than the first step, and during the course of which a gas valve is opened so as to connect a headspace of the source tank to the first portion of the main pipe. This then is a third variant of the drainage method. Unlike in the first variant and the second variant, the first valve here is kept open. The gas valve is positioned on a gas line extending between the headspace of the source tank and the first portion of the main pipe. Opening this gas valve allows a vapor phase of the liquid-form gas to circulate in the main pipe. In this third variant, it is thus the vapor phase of the liquid-form gas that will drive the liquid-form gas that has remained in the main pipe. Once this has been done and once the return pipe has been opened during the third step of the drainage method, no more liquid-form gas remains in the main pipe and the return pipe. These pipes can then be inserted with molecular nitrogen before being disconnected in complete safety.

According to one feature of the invention, the drainage method comprises a fourth step, consecutive with the third step, of heating the main pipe. What should be understood by heating of the main pipe is any means liable to bring about an increase in the temperature of the liquid-form gas that has remained in the main pipe. The heating of the main pipe may for example consist in irrigating the main pipe with seawater. This fourth step makes it possible to bring about an increase in pressure with a view to encouraging the liquid-form gas to flow within the return pipe. The fourth step may be performed with any variant of the drainage method.

Figure 2:
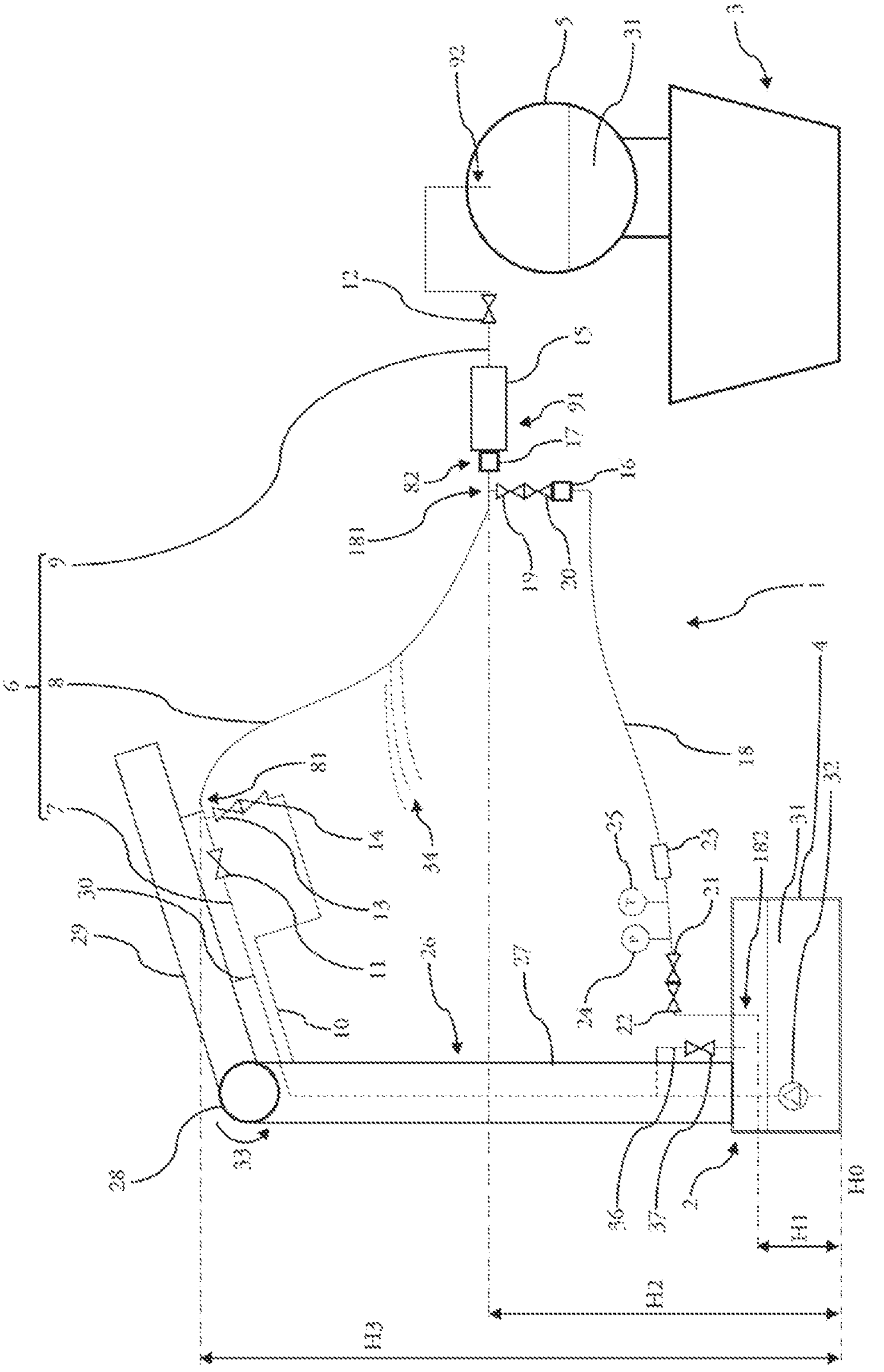
Figure 3:
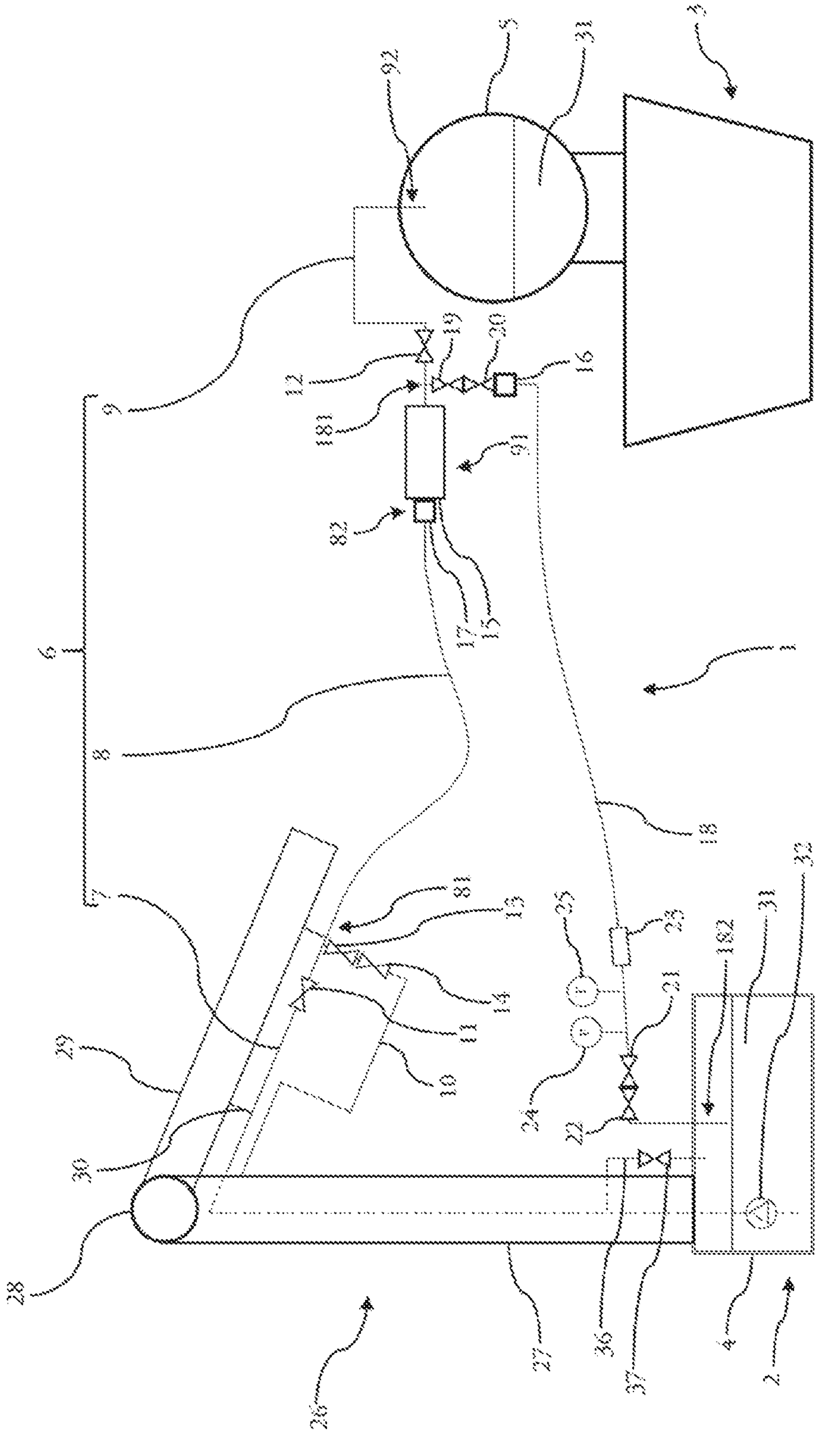
Figure 4:
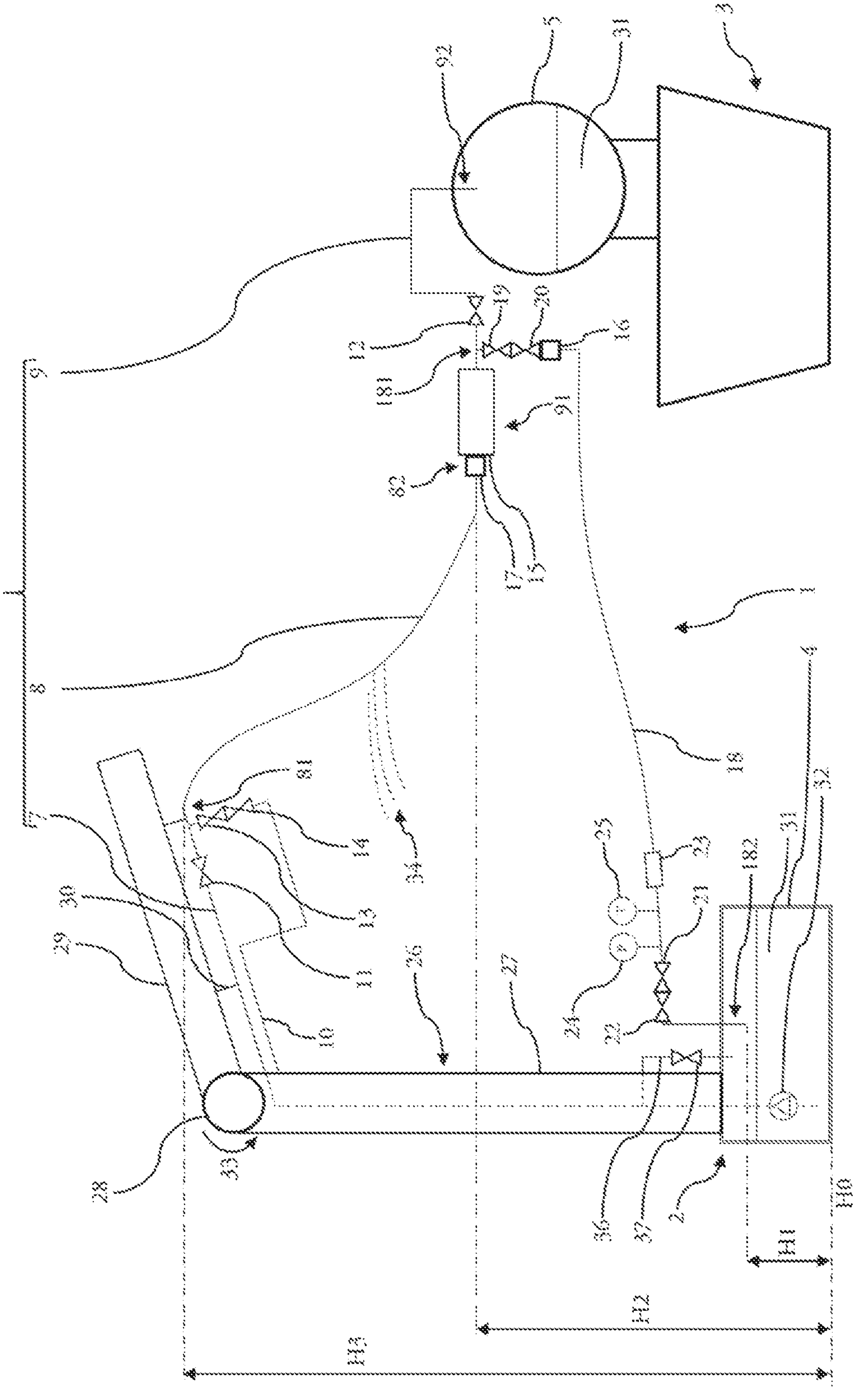
Figure 5:
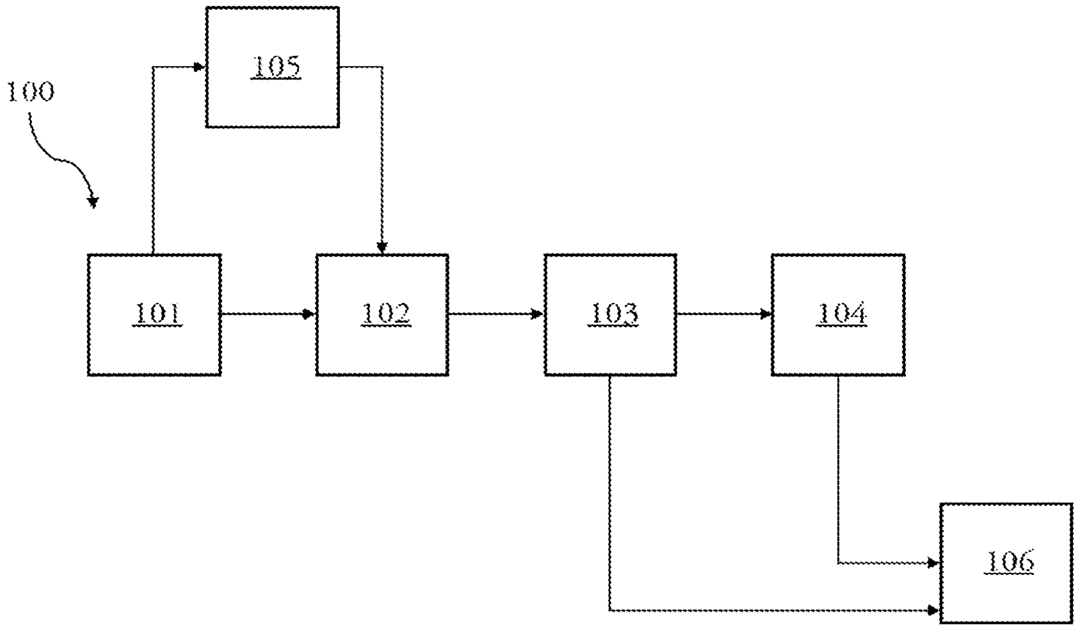
Figure 6:
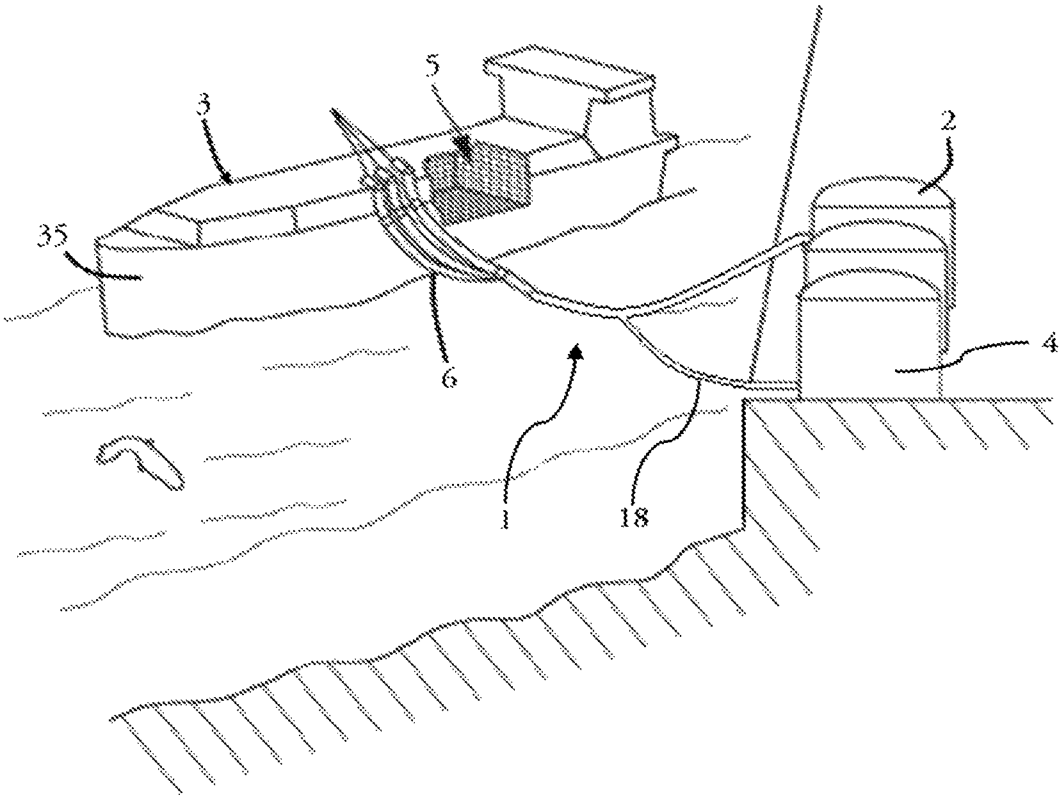

Further features and advantages of the invention will become more apparent through, on the one hand, the following description and, on the other hand, a number of exemplary embodiments given by way of nonlimiting indication with reference to the attached schematic drawings in which:

FIG. 1 is a schematic depiction of a first embodiment of a liquid-form gas transfer system according to the invention, during a liquid-form gas transfer operation, FIG. 2 is a schematic depiction of the first embodiment of the transfer system during a liquid-form gas drainage operation, FIG. 3 is a schematic depiction of a second embodiment of the transfer system during the liquid-form gas transfer operation, FIG. 4 is a schematic depiction of the second embodiment of the transfer system during the liquid-form gas drainage operation, FIG. 5 is a flow chart of a liquid-form gas drainage method according to the invention, FIG. 6 is a schematic depiction, with cutaway, of a tank of a transport ship and of a maritime terminal used for loading this tank.

During the course of this description, the terms "upstream" and "downstream" will refer to a positioning of elements relative to a direction of circulation of liquid-form gas within the pipes mentioned.

FIG. 1 depicts a first embodiment of a liquid-form gas transfer system 1.

The transfer system 1 transfers a liquid-form gas 31 from a liquid-form gas source unit 2 to a liquid-form gas receiving unit 3. The liquid-form gas source unit 2 comprises a source tank 4 and the liquid-form gas receiving unit 3 comprises a receiving tank 5. It will thus be appreciated that the transfer system 1 collects the liquid-form gas 31 contained in the source tank 4 with a view to conveying it to the receiving tank 5 in order to fill the latter. By way of example, the liquid-form gas source unit 2 and the liquid-form gas receiving unit 3 associated with it may correspond to various examples as set out in the following table:

TABLE 2

| Source unit | Receiving unit |
|---|---|
| On-shore reservoir, floating reliquefaction unit, other reliquefaction unit, gravity platform | Methane tanker, barge, ship running on liquid-form gas of the cruise liner, container ship, ferry type |
| Methane tanker | Barge, ship running on liquid-form gas of the cruise liner, container ship, ferry type |
| Barge | Ship running on liquid-form gas of the cruise liner, container ship, ferry type |

In FIG. 1, the liquid-form gas source unit 2 may for example be a loading barge or a quayside for the loading of liquid-form gas. The liquid-form gas receiving unit 3 illustrated in FIG. 1 corresponds to a ship that transports liquid-form gas, for example a methane tanker.

In order to transfer the liquid-form gas 31 from the source tank 4 to the receiving tank 5, the transfer system 1 comprises a main pipe 6 that participates in an operation of transferring the liquid-form gas 31. The transfer system 1 also comprises a return pipe 18 that at least partially contributes to an operation of draining the liquid-form gas 31 once the transfer operation is complete.

The main pipe 6 extends overall from the source tank 4 where the main pipe 6 collects the liquid-form gas, to the point at which it opens into the receiving tank 5. In this capacity, the main pipe 6 comprises a first portion 7, a flexible second portion 8, and a third portion 9. The first portion 7 is partially immersed in the liquid-form gas 31 of the source tank 4. The liquid-form gas 31 of the source tank 4 can thus circulate in the main pipe 6 by passing through the first portion 7. The first portion 7 comprises a pump 32 the purpose of which is to draw the liquid-form gas 31 from the source tank 4 into the main pipe 6. The transfer operation is therefore initiated by bringing the pump 32 of the first portion 7 into operation. The first portion 7 outside of the source tank 4 is supported by an articulated support device 26. The articulated support device 26 may for example be a crane positioned at the level of the liquid-form gas source unit 2. The articulated support device 26 comprises a mast 27, a jib 29 and a pivot 28 connecting the jib 29 to the mast 27. The pivot 28 is thus able to cause the jib 29 to pivot with respect to the mast 27. The mast 27 extends mainly vertically and the first portion 7 extends along the mast 27, being for example fixed thereto by any fixing means. The first portion 7 also extends along the jib 29 where it is supported thereby, for example via at least one bearer 30. Thus, when the jib 29 is articulated via the pivot 28, the first portion 7 is driven by the jib 29 via the bearer 30. The first portion 7 also comprises a first valve 11. The first valve 11 is able to be opened or closed by hand or by remote control. The first valve 11 either allows or does not allow the circulation of liquid-form gas 31 within the main pipe 6.

The flexible second portion 8 is positioned in continuity with the first portion 7. The flexible second portion 8 is connected to the first portion 7 via a first end 81 of the flexible second portion 8. As a result, the flexible second portion 8 is secured to the articulated support device 26 on account of the connection between the first portion 7 and the first end 81 of the flexible second portion 8, and on account of the fact that the first portion 7 is supported by the bearer 30 of the articulated support device 26.

The third portion 9 is present at the liquid-form gas receiving unit 3 and comprises a first termination 91 equipped with a header 15 and a second termination 92 which opens into the receiving tank 5. The header 15 allows the connection of the main pipe 6 so that the latter can connect the source tank 4 to the receiving tank 5 and thus allow the transfer operation to be performed. The second termination 92 of the third portion 9 is at least partially inserted into an internal volume of the receiving tank 5 so that the latter tank can receive the liquid-form gas 31 coming from the source tank 4 during the transfer operation. The third portion 9 comprises a second valve 12 positioned between the header 15 and the second termination 92 of the third portion 9. The second valve 12, just like the first valve 11, allows or prevents the transfer of liquid-form gas 31 from the source tank 4 to the receiving tank 5. Thus, to ensure that the transfer operation takes place, the first valve 11 and the second valve 12 need to both be opened so that the liquid-form gas 31 can circulate from the source tank 4 to the receiving tank 5.

In order for the transfer operation to be able to be performed, a second end 82 of the flexible second portion 8 needs to be connected to the header 15 of the third portion 9. The flexible second portion 8 can thus be brought closer to the liquid-form gas receiving unit 3 by virtue of the articulated support device 26 and then the second end 82 of the flexible second portion 8 is then connected to the header 15 of the third portion 9. Following this operation, the main pipe 6 is completely connected, and the transfer 5 operation may begin. The flexibility of the flexible second portion 8 facilitates the connection between the flexible second portion 8 and the third portion 9. The first portion 7 and the third portion 9 may be flexible or rigid.

Before the transfer system is set in place, the first portion 7 and the flexible second portion 8 are stored on the liquid-form gas source unit 2, just like the return line 18 is. The third portion 9 is stored on the liquid-form gas receiving unit 3.

The return pipe 18 is connected upstream of the second end 82 of the flexible second portion 8 and therefore extends from the main pipe 6 until it opens into the source tank 4. The return pipe 18 comprises a first end 181 connected to the main pipe 6, and a second end 182 at least partially inserted into an internal volume of the source tank 4. The return pipe 18 allows the return of the liquid-form gas 31 to the source tank 4 when the transfer operation is complete and liquid-form gas 31 still remains in the main pipe 6. The details regarding the drainage operation will be set out hereinafter.

The return pipe 18 comprises a first flow controller 19, a second flow controller 20, a third flow controller 21 and a fourth flow controller 22. The first flow controller 19 and the second flow controller 20 are situated at the first end 181 of the return pipe while the third flow controller 21 and the fourth flow controller 22 are situated at the second end 182. From a terminology standpoint, the term flow controller is differentiated from the term valve in so far as the flow controllers are situated only on the return pipe 18. The four flow controllers allow the liquid-form gas 31 to circulate in the return pipe 18 during the drainage operation. Incorporating a plurality of flow controllers into the return pipe 18 makes it possible to regulate the flow rate of the liquid-form gas 31 circulating in the return pipe 18, there being the risk that a flow rate that is too high and too sudden may damage the return pipe 18. During the transfer operation, all of the flow controllers are closed to prevent the liquid-form gas 31 from circulating in the return pipe 18.

The return pipe 18 comprises an emergency disconnection device 23. The emergency disconnection device 23 allows the return pipe 18 to be separated from the main pipe 6 when too much mechanical stress is applied to the return pipe 18. Such mechanical stress may for example be caused by too much swell leading to tension in the return pipe 18.

The return pipe 18 also comprises a pressure sensor 24 and a temperature sensor 25 which respectively measure the pressure and the temperature within the return pipe 18. Such measurements allow the drainage operation to run smoothly, as will be described in detail hereinafter.

The return pipe 18 is connected to the main pipe 6 via a first connection/disconnection device 16. The flexible second portion 8 is connected to the header 15 of the third portion 9 by a second connection/disconnection device 17. Each of these connection/disconnection devices allow fluidtight and secure connection.

The transfer system 1 also comprises a pressurizing line 10 connected to the first portion 7 of the main pipe 6. The pressurizing line 10 is able to input a fluid into the main pipe 6 and the return pipe 18. Such a fluid may, for example, be an inerting fluid such as molecular nitrogen, and may be used during the drainage operation to drive the liquid-form gas 31 in the main pipe 6 and in the return pipe 18. The pressurizing line 10 comprises a third valve 13 and a fourth valve 14. The fluid is able to come from the pressurizing line 10 if the third valve 13 and the fourth valve 14 are both open.

The transfer system 1 may also comprise a gas line 36 which connects a headspace of the source tank 4 to the first portion 7 of the main pipe 6. A gas valve 37 is positioned on the gas line 36 and allows or does not allow a gas phase of the liquid-form gas 31 of the source tank 4 to circulate in the main pipe 6. Just like the pressurizing line 10, the gas line 36 may contribute to the operation of draining the liquid-form gas that has remained in the main pipe 6. The various variants of the drainage operation will be set out in detail hereinafter.

Thus, during the transfer operation, and once the flexible second portion 8 has been connected to the header 15 of the third portion 9, the flow controllers of the return pipe 18 are closed and the first valve 11 and the second valve 12 are opened. The third valve 13 and the fourth valve 14 are also closed. The pump 32 situated on the main line 6 is set in operation and draws in the liquid-form gas 31 that is in the source tank 4. The liquid-form gas 31 therefore circulates in the first portion 7, the flexible second portion 8 and the third portion 9 until it flows out into the receiving tank 5. The transfer operation continues until the receiving tank 5 is full or until it reaches a filling corresponding to the demand from the liquid-form gas receiving unit 3. Once this has happened, the pump 32 is stopped and the drainage operation can then commence.

FIG. 2 depicts the transfer system 1 according to the same embodiment as in FIG. 1. However, FIG. 2 illustrates a positioning of the transfer system 1 when the transfer operation is complete and the drainage operation has commenced. Because drainage is achieved under the effect of gravity, FIG. 2 illustrates a plurality of heights for certain elements of the transfer system 1. Each of these heights is defined as a function of a height reference $H_0$ which may for example correspond to sea level. Three heights are thus illustrated. A first height $H_1$ corresponds to a height of the second end 182 of the return pipe 18. A second height $H_2$ corresponds to a height of the first end 181 of the return pipe 18 and to a height of the second end 82 of the flexible second portion 8 of the main pipe, these two ends in FIG. 2 being situated at the same height relative to one another. Finally, a third height $H_3$ corresponds to a height of the first end 81 of the flexible second portion 8 of the main pipe 6.

Once the transfer operation is complete, the second valve 12 is closed. The first valve 11 may also be closed depending on the variant of drainage method used. Thus, a part of the main pipe 6 situated upstream of the second valve 12, or between the first valve 11 and the second valve 12, is isolated from the receiving tank 5 so as to avoid potential returns of liquid-form gas in the main pipe 6. It is the liquid-form gas 31 that has remained in the main pipe 6 upstream of the second valve 12 or between the first valve 11 and the second valve 12 that will be drained off during the drainage operation.

After that, the jib 29 of the articulated support device 26 is lifted upward. To do that, the pivot 28 performs a rotation 33 in the counterclockwise direction, thus causing the jib 29 to be raised. The objective of this movement of the articulated support device 26 is to increase the third height $H_3$ relative to the height of the first end 81 of the flexible second portion 8, so that the third height $H_3$ is greater than the second height $H_2$, relative to the height of the second end 82 of the flexible second portion 8. The second end 82 of the flexible second portion 8 is thus vertically lower down than the first end 81 of the flexible second portion 8. The fact that the third height $H_3$ is greater than the second height $H_2$ means that the liquid-form gas 31 that has remained in the main pipe 6 can be made to circulate under the effect of gravity so that it collects at the second end 82 of the flexible second portion 8. By doing that, the formation of pockets of liquid-form gas 31 in the main pipe 6 is avoided, leading to an optimal drainage operation.

The drainage operation continues by the first flow regulator 19 of the return pipe 18 being opened fully, and then with the progressive opening of the second flow regulator 20, the third flow regulator 21 and the fourth flow regulator 22 also being opened. By opening each of the flow regulators of the return pipe 18, the liquid-form gas 31 will flow therein. It is possible to initiate the flowing of the liquid-form gas 31 in the return pipe 18 by irrigating the main pipe 6, for example with a jet of seawater 34. A pressure differential is thus created and encourages the liquid-form gas 31 to flow in the return pipe 18.

The liquid-form gas 31 is drained under the effect of gravity. In other words, the second height $H_2$, relative to the height of the first end 181 of the return pipe 18, is greater than the first height $H_1$, relative to the height of the second end 182 of the return pipe 18. The liquid-form gas 31 thus flows naturally in the return pipe 18 until it flows out into the source tank 4, the second end 182 of the return pipe 18 being vertically lower down than the first end 181 of the return pipe 18. Advantageously, the difference in height between the first height $H_1$ and the second height $H_2$ is at minimum of the order of three to four meters, so as to encourage the liquid-form gas 31 to flow.

During the course of the drainage operation, the temperature sensor 25 measures the temperature within the return pipe 18. The temperature measurement makes it possible to check whether any liquid-form gas 31 remains in the return pipe 18. If the temperature is above a determined minimum temperature threshold, that means that there is no longer any liquid-form gas 31 remaining in the return pipe 18.

If, despite the gravitational drainage, the temperature in the return pipe 18 does not increase, that means that some liquid-form gas 31 still remains in the return pipe 18. There are a number of possible ways of optimizing drainage.

It is, for example, possible to close the first valve 11 if this is open, and then open the third valve 13 and the fourth valve 14 of the pressurizing line 10. The latter will then allow fluid to circulate to drive the liquid-form gas 31 that has remained in the main line and/or in the return line 18 and that has not been removed under gravity. The fluid in the pressurizing line 10 may for example be an inert gas such as molecular nitrogen. The opening of the third valve 13 and of the fourth valve 14 is possible only if the pressure in the return pipe 18 is sufficiently low, for example below 3·5 bar. The pressure in the return pipe is checked using the pressure sensor 24. It is thus the pressure sensor 24 that determines the moment at which the fluid in the pressurizing line 10 can be input into the main pipe 6 and into the return pipe 18. Rather than driving the liquid-form gas 31, the fluid from the pressurizing line 10 may also circulate at ambient temperature so as to cause the liquid-form gas 31 that has remained in the main pipe 6 to evaporate.

Alternatively, it is possible to optimize drainage by opening the gas valve 37, thus allowing a vapor phase of the liquid-form gas 31 to circulate in the gas line 36 and then in the main pipe 6. It is therefore this vapor phase of the liquid-form gas 31 that will drive the liquid-form gas 31 that has remained in the main pipe 6. Obviously, for such an alternative to work, the first valve 11 needs to be opened.

When the temperature measured by the temperature sensor 25 is estimated to be high enough for it to be possible to consider that there is no longer any liquid-form gas 31 in the return pipe 18, then the drainage operation is complete. The flexible second portion 8 of the main pipe 6 can then be disconnected from the header 15 of the third portion 9, and the return pipe 18 can be disconnected from the main pipe 6. The liquid-form gas receiving unit 3 is thus filled and disconnected and may thus for example perform its mission of transporting the liquid-form gas 31 that has just been loaded into the receiving tank 5 or may consume the liquid-form gas 31 for propulsion.

FIGS. 3 and 4 depict a second embodiment of the transfer system 1 according to the invention. For this second embodiment, only a position at which the return pipe 18 is connected to the main pipe 6 differs from the first embodiment depicted in FIGS. 1 and 2. Thus, only this connection will be discussed in the description specific to the second embodiment, and reference will be made to FIGS. 1 and 2 for the description of the parts that the two embodiments have in common.

In FIGS. 3 and 4, the connection of the return pipe 18 to the main pipe 6 is made at the third portion 9. More specifically, the first end 181 of the return pipe 18 is situated downstream of the header 15 and upstream of the second valve 12. Such a positioning that differs from the first embodiment alters neither the operation of transferring the liquid-form gas 31 nor the operation of draining the liquid-form gas 31. The first end 181 of the return pipe does, on the other hand, of necessity need to be positioned upstream of the second valve 12 so that the latter valve can isolate the receiving tank 5 from the main pipe 6 by being re-closed.

FIG. 4 is the counterpart of FIG. 2, for the second embodiment. In other words, FIG. 4 depicts the second embodiment of the transfer system 1 during the drainage operation. The drainage method is identical to that of the first embodiment. Thus, the second valve 12 and possibly the first valve 11 are closed, then the articulated support device 26 raises the jib 29, thus creating the height differential between the second height $H_2$ and the third height $H_3$. The second height $H_2$ is itself greater than the first height $H_1$ to ensure drainage under the effect of gravity. The liquid-form gas 31 can thus flow into the return pipe 18 after the flow controllers thereof have been opened.

FIG. 5 is a flowchart depicting the drainage method 100 for draining the liquid-form gas according to the invention. The drainage method 100 is initiated once the transfer operation is complete. The end of the transfer operation is marked by the stopping of the pump used for circulating the liquid-form gas from the source tank to the receiving tank. The drainage method 100 begins with a first step 101 during which the second valve of the third portion is also closed. Closing the second valve allows the receiving tank to be isolated when the liquid-form gas that has remained in the main pipe is circulating in the return pipe. Specifically, there is a risk of liquid-form gas returning from the receiving tank to the return pipe, for example as a result of a pressure differential between the receiving tank and the return pipe. Such a situation is liable to arise in particular if the liquid-form gas transfer system is installed in accordance with the second embodiment as the first end of the return pipe is situated at the level of the third portion, and therefore closer to the receiving tank than in the first embodiment. The closing of the second valve alleviates this disadvantage, which is why the second valve is systematically downstream of the connection of the return pipe whatever the embodiment of the transfer system. It will be appreciated that the first step 101 absolutely must be performed before any other step of the drainage method 100 in order to ensure its smooth operation. Thus, the liquid-form gas that has remained in the main pipe part situated upstream of the second valve is the gas with which the drainage method 100 is concerned.

Once the first step 101 has been completed, the drainage method 100 continues with a second step 102 in which the articulated support device is raised so as to create the height differential between the first end of the flexible second portion and the second end of the flexible second portion. The latter is in fact liable to create pockets of liquid-form gas as a result of its flexibility. The potential creation of such pockets may lead to difficulties in circulating the liquid-form gas as far as the return pipe. Raising the articulated support device thus makes it possible to create an appreciable height differential between the two ends of the flexible second portion and thus collect the liquid-form gas that has remained in the main pipe in its entirety or almost its entirety. The liquid-form gas that has remained in the main pipe is thus amassed near the first end of the return pipe so that it can be more easily and effectively drained into the return pipe. In order to bring about optimal flow of the liquid-form gas in the return pipe, the first step 101 and the second step 102 need both to be performed before the liquid-form gas is allowed any access whatsoever to the return pipe.

It is not until a third step 103 that all of the flow controllers on the return pipe are opened. To avoid damaging the return pipe by causing too strong or too sudden a flow of liquid-form gas therein, at least one of the flow controllers may be opened progressively.

Once the third step 103 has been performed, the drainage method 100 may end directly with an end step 106. However, the drainage method 100 may comprise a fourth step 104 and/or an additional step 105 allowing the drainage operation to be optimized.

The fourth step 104 makes it possible to initiate a flow of liquid-form gas in the return pipe in the event of a blockage caused by the pressure in the main pipe and/or the return pipe. Thus, the fourth step 104 consists in heating the main pipe in order to cause the liquid-form gas that has remained in the main pipe to start to evaporate and thus create a pressure differential encouraging the liquid-form gas to flow in the return pipe. The heating of the main pipe may for example be achieved using a jet of seawater, as depicted in FIGS. 2 and 4, but any other means of causing the temperature of the liquid-form gas to rise and that is suited to the context of the invention, is conceivable.

The additional step 105 may be performed after the first step 101 as depicted in FIG. 5, but the additional step 105 can be performed at any moment in the sequence of the drainage method 100 provided that moment comes later than the first step 101. The additional step 105 may proceed according to a number of variants.

A first variant is to close the first valve so as to isolate a section of the main pipe containing liquid-form gas. The fourth step 104 may then suffice to cause the liquid-form gas that has remained in the tank to drain off under the effect of gravity, and the drainage method 100 may thus end.

If this is not enough, it is possible to use a second variant of the drainage method 100. The second variant may be used after the use of the first variant, or else may be used immediately without proceeding via the first variant. The second variant consists first of all in closing the first valve, then injecting the fluid from the pressurizing line, doing this by opening the third valve and the fourth valve, into the main pipe and the return pipe. The purpose of this second variant is to drive the liquid-form gas that has remained in the main pipe or the return pipe and that has not been removed under the effect of gravity. The fluid thus drives the liquid-form gas toward the source tank through the main pipe and the return pipe. The second variant of the additional step 105 thus makes it possible to complete the drainage operation in a way that is reliable, so that it is possible to be certain that there is no longer any liquid-form gas remaining in the main pipe and in the return pipe. Execution of the second variant is dependent on the pressure in the return pipe. The pressure needs to be low enough, for example below 3·5 bar, and it is the pressure sensor present on the return pipe that is used to check whether the second variant can proceed. In this second variant, the fluid used is different than the liquid-form gas and may for example be molecular nitrogen.

It is also possible to use a third variant of the additional step 105. The third variant differs from the first variant and from the second variant notably in that the first valve needs to remain open so that the third variant can be applied. The third variant consists in opening the gas valve, so as to connect the headspace of the source tank to the main pipe via the gas line. It is thus the vapor phase of the liquid-form gas that will circulate in the main pipe and drive the liquid-form gas remaining in the main pipe as far as the return pipe.

In order to complete the drainage method 100 using the end step 106, it is advantageous to check that no liquid-form gas remains in the return pipe. This check is at least partially provided by the temperature sensor present on the return pipe. A sufficiently high temperature, for example a temperature higher than −85° C., in the return pipe confirms that there is no longer any liquid-form gas in the return pipe. The drainage method 100 may then end with the end step 106, which is a sign that the main pipe and the return pipe can be disconnected in complete safety.

FIG. 6 depicts an example of a maritime terminal provided with the transfer system 1, the latter comprising the main pipe 6 and the return pipe 18. The transfer system 1 allows the liquid-form gas to be transferred from the liquid-form gas source unit 2, which in this instance is a fixed offshore installation. The transfer system 1 allows the liquid-form gas receiving unit 3, which in FIG. 6 is illustrated as being a transport ship 35 and comprises the receiving tank 5 to be loaded, the loading being performed from the liquid-form gas source unit 2. This unit comprises at least the source tank 4 connected to the transfer system 1.

Once the liquid-form gas has been transferred from the source tank 4 to the receiving tank 5, and in order to disconnect the main pipe 6 in complete safety, the drainage method described in FIG. 5 is implemented so that the liquid-form gas that has remained in the main pipe 6 returns to the source tank 4 by passing along the return pipe 18.

Of course, the invention is not restricted to the examples that have just been described and numerous adaptations may be made to these examples without departing from the scope of the invention.

The invention, as has just been described, does indeed achieve its stated objective and is able to propose a liquid-form gas transfer system comprising a main pipe and a return pipe allowing the liquid-form gas to return to its starting point using drainage under the effect of gravity. Variants not described here may be implemented without departing from the context of the invention, provided that they comprise a liquid-form gas transfer system in accordance with the invention.

The invention claimed is:

1. A transfer system for transferring liquid-form gas between two liquid-form gas units, comprising a main pipe configured to transfer the liquid-form gas from a source tank of a liquid-form gas source unit to a receiving tank of a liquid-form gas receiving unit, said main pipe comprising at least a first portion and a flexible second portion, the transfer system comprising an articulated support device for supporting the main pipe, the first portion being secured to the articulated support device and configured to withdraw the liquid-form gas contained in the source tank, wherein the transfer system comprises at least one return pipe configured to convey the liquid-form gas present in the main pipe toward the source tank, the transfer system for transferring liquid-form gas being configured to drain the liquid-form gas present in the main pipe under gravity toward the source tank via the return pipe.

2. The transfer system as claimed in claim 1, wherein the draining of the liquid-form gas is activated by at least one flow controller situated on the return pipe.

3. The transfer system as claimed in claim 1, wherein the return pipe comprises an emergency disconnection device.

4. The transfer system as claimed in claim 1, wherein the return pipe comprises at least a pressure sensor and at least a temperature sensor sensing the pressure and the temperature of the return pipe.

5. The transfer system as claimed in claim 1, wherein the return pipe has a bore section of between 300 $mm^2$ and 2000 $mm^2$.

6. The transfer system as claimed in claim 1, wherein the circulation of the liquid-form gas within the main pipe is activated by at least a first valve positioned on the main pipe.

7. The transfer system as claimed in claim 1, comprising a pressurizing line connected to the main pipe and configured to remove the liquid-form gas present in the main pipe and in the return pipe.

8. The transfer system as claimed in claim 1, wherein the return pipe comprises a first end connected to the main pipe and a second end configured to open into the source tank of the liquid-form gas source unit, the second end of the return pipe being vertically lower down than the first end of the return pipe.

9. The transfer system as claimed in claim 8, wherein the first end of the return pipe is connected to the main pipe via a first connection/disconnection device.

10. The transfer system as claimed in claim 1, wherein the flexible second portion is configured to be connected to the header of the third portion by a second connection/disconnection device.

11. The transfer system as claimed in claim 10, wherein the return pipe is connected to the main pipe in the flexible second portion thereof upstream of the header.

12. The transfer system as claimed in claim 10, wherein the return pipe is connected to the main pipe in the third portion thereof downstream of the header of the third portion and upstream of the second valve of the third portion.

13. The transfer system as claimed in claim 1, wherein the flexible second portion of the main pipe comprises a first end and a second end, the first end of the flexible second portion being secured to the articulated support device.

14. The transfer system as claimed in claim 3, wherein the main pipe comprises a third portion, said third portion comprising a first termination provided with a header, and a second termination configured to open into the receiving tank.

15. The transfer system as claimed in claim 14, wherein the third portion comprises at least a second valve positioned between the header of the third portion and the second termination of the third portion.

16. A drainage method for draining a liquid-form gas, implemented by a transfer system for transferring liquid-form gas as claimed in claim 8, and comprising:

a first step in which at least the second valve of the third portion of the main pipe is closed, a second step in which the articulated support device supporting the main pipe is raised so as to position the first end of the flexible second portion vertically higher up than the second end of the flexible second portion, a third step in which at least the flow controller of the return pipe is opened.

17. The drainage method as claimed in claim 16, comprising an additional step that comes later than the first step, and during the course of which a gas valve is opened so as to connect a headspace of the source tank to the first portion of the main pipe.

18. The drainage method as claimed in claim 16, comprising a fourth step, consecutive with the third step of heating the main pipe.

19. The drainage method as claimed in claim 16, comprising an additional step that comes later than the first step, and during which at least the first valve of the main pipe is closed.

20. The drainage method as claimed in claim 19, during the course of which a fluid different than the liquid-form gas is injected so as to drive out the liquid-form gas present in the main pipe.

* * * * *